(12) United States Patent
Mulhouse et al.

(10) Patent No.: US 7,642,674 B2
(45) Date of Patent: Jan. 5, 2010

(54) SWITCH STATE ASSURANCE SYSTEM

(75) Inventors: David P. Mulhouse, Minnetonka, MN (US); Robert D. Juntunen, Minnetonka, MN (US)

(73) Assignee: Honeywell International Inc., Morristown, NJ (US)

( * ) Notice: Subject to any disclaimer, the term of this patent is extended or adjusted under 35 U.S.C. 154(b) by 173 days.

(21) Appl. No.: 11/381,918

(22) Filed: May 5, 2006

(65) Prior Publication Data

US 2007/0115135 A1    May 24, 2007

Related U.S. Application Data

(63) Continuation-in-part of application No. 11/164,464, filed on Nov. 23, 2005, now Pat. No. 7,476,988.

(51) Int. Cl.
*B23K 11/24* (2006.01)

(52) U.S. Cl. .................................................. 307/112

(58) Field of Classification Search .................. 307/112
See application file for complete search history.

(56) References Cited

U.S. PATENT DOCUMENTS

| | | | |
|---|---|---|---|
| 4,078,720 A | 3/1978 | Nurnberg | |
| 4,157,506 A | 6/1979 | Spencer | |
| 4,504,778 A | 3/1985 | Evans | |
| 4,695,246 A | 9/1987 | Beilfuss et al. | |
| 4,745,300 A | 5/1988 | Kammerer et al. | |
| 4,806,843 A | 2/1989 | Mertens et al. | |
| 4,842,510 A | 6/1989 | Grunden et al. | |
| 4,872,828 A | 10/1989 | Mierzwinski et al. | |
| 4,955,806 A | 9/1990 | Grunden et al. | |
| 5,025,134 A | 6/1991 | Bensoussan et al. | |
| 5,081,411 A | 1/1992 | Walker | |
| 5,158,477 A | 10/1992 | Testa et al. | |
| 5,175,439 A | 12/1992 | Harer et al. | |
| 5,192,874 A | 3/1993 | Adams | |
| 5,255,179 A | 10/1993 | Zekan et al. | |
| 5,277,244 A | 1/1994 | Mehta | |
| 5,347,982 A | 9/1994 | Binzer et al. | |
| 5,506,569 A | 4/1996 | Rowlette | |
| 5,903,139 A | 5/1999 | Kompelien | |
| 6,060,719 A | 5/2000 | DiTucci et al. | |
| 6,084,518 A | 7/2000 | Jamieson | |
| 6,222,719 B1 | 4/2001 | Kadah | |

(Continued)

FOREIGN PATENT DOCUMENTS

CA    1035448    7/1978

(Continued)

*Primary Examiner*—Robert L. Deberadinis

(57) ABSTRACT

A switch state assurance mechanism of a power stealing circuit for connection to a thermostatically controlled or other kind of operational system. The mechanism may be an interface for the power stealing circuit to the operational system. A switch or relay of the mechanism may have several states but have an appropriate state for a given status of the power stealing circuit and the operational system. The switch or relay may have a latching characteristic relative to its states. The mechanism may have a detection circuit and a drive circuit connected to the relay, and a control circuit connected to the detection circuit and the drive circuit. The mechanism may check the relay state and change the relay to a desired state. The mechanism may be incorporated in other circuits beside a power stealing circuit.

10 Claims, 4 Drawing Sheets

U.S. PATENT DOCUMENTS

| | | |
|---|---|---|
| 6,275,160 B1 * | 8/2001 | Ha .............................. 340/606 |
| 6,490,174 B1 | 12/2002 | Kompelien |
| 6,509,838 B1 | 1/2003 | Payne et al. |
| 6,566,768 B2 | 5/2003 | Zimmerman et al. |
| 6,743,010 B2 | 6/2004 | Bridgeman et al. |
| 6,794,771 B2 | 9/2004 | Orloff |
| 2003/0064335 A1 | 4/2003 | Canon |
| 2004/0209209 A1 | 10/2004 | Chodacki et al. |

FOREIGN PATENT DOCUMENTS

| | | |
|---|---|---|
| FR | 2491692 | 4/1982 |

* cited by examiner

SWITCH STATE ASSURANCE SYSTEM

This invention is continuation-in-part of U.S. patent application Ser. No. 11/164,464, filed Nov. 23, 2005. U.S. patent application Ser. No. 11/164,464, filed Nov. 23, 2005, is hereby incorporated by reference.

BACKGROUND

This invention pertains to thermostat devices and particularly to such devices having latching switches. More particularly, the invention pertains to states of the switches.

SUMMARY

The invention is a mechanism that assures a proper state of a switch for a control system.

DESCRIPTION

The latching relays commonly used in today's thermostats tend to be very popular since they are relatively inexpensive, provide a low resistance mechanical contact, and can be driven from battery power without greatly impacting battery life. While these are significant advantages, one disadvantage of latching relays is their susceptibility to changing state should they encounter a physical shock. Such shock commonly occurs during standard shipping tests. If an un-powered thermostat were installed after having experienced a high enough shock to change the relay state, and upon subsequent installation, the HVAC equipment could turn on. This situation may be mitigated by re-asserting the relay state when the new batteries are installed or by an application of power to the thermostat. In off cycle power-sealing thermostatic designs, it is not possible to start power stealing if the relay is in the wrong state upon installation; however, a battery backup may mitigate this concern. With the latter approach, a time base re-assertion strategy may consume much battery energy. The present invention may solve the energy consumption issue and insure any un-commanded relay state change that occurs is corrected before or after installation.

In essence, a switch state assurance system may involve a switch or relay having several states and a control circuit connected to the switch. The control circuit may check the correctness of a state of the switch. If the state is incorrect, then the control circuit may put the switch into the correct state.

Many commonly used latching relays contain two sets of contacts (i.e., double pole, double throw); however, only one set of contacts are typically needed for the thermostatically controlled system. The present invention may make use of the second set of contacts to provide the microcontroller an interrupt "notification" of the state change.

One illustrative example of the present invention, as associated with an electronic thermostatic system, may tie the contacts directly to the various terminals, such as a voltage, ground, and those of the controlled system. A center common contact or terminal may be connected back to a controller of the thermostat. At any time, the controller may poll the center contact or terminal pin to detect the actual relay state. In addition to this, the microcontroller may idle in a low-power deep-sleep state or mode where an unintended relay change-state event can cause a low-to-high or high-to-low pin change interrupt at the microcontroller. This event may allow the microcontroller to wake up and process the unintended relay change state by automatically putting the relay back into its default position, particularly of an uninstalled mode.

Figure 1:
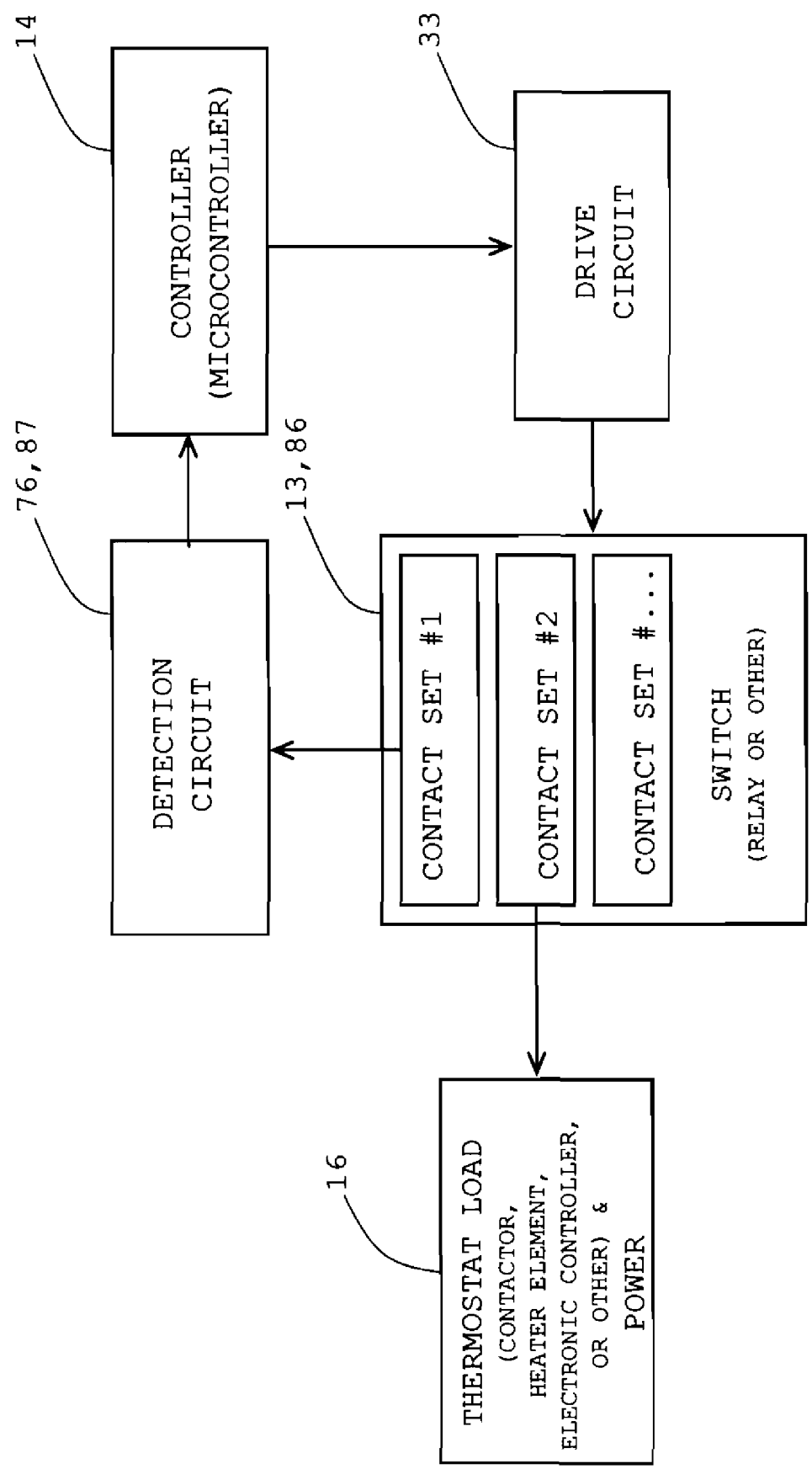
FIG. 1 is a block diagram of the switch state assurance system.
Figure 2:
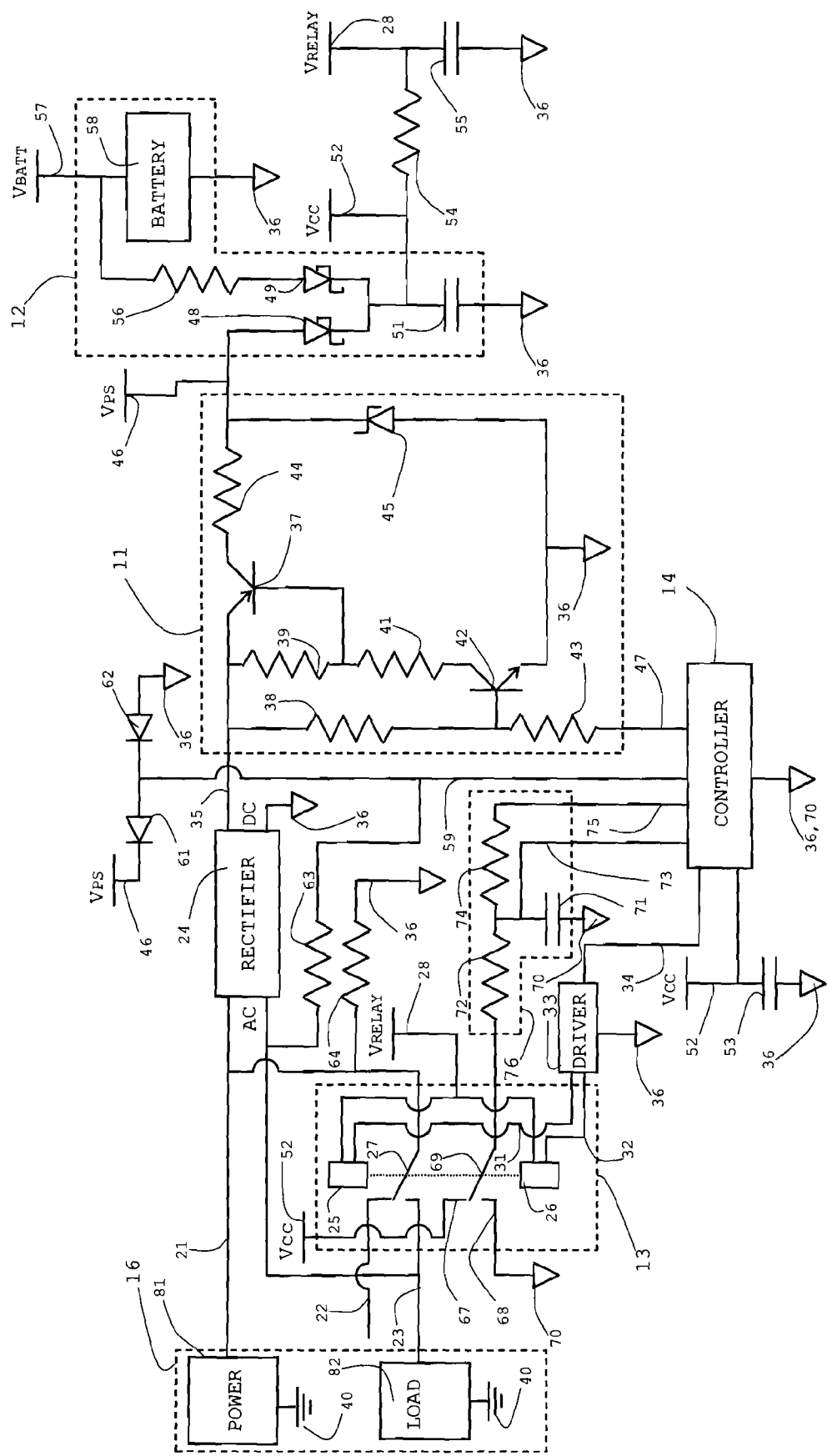
FIG. 2 shows a switch state assurance system having a two component actuator in conjunction with a power stealing mechanism in a control system.
Figure 3:
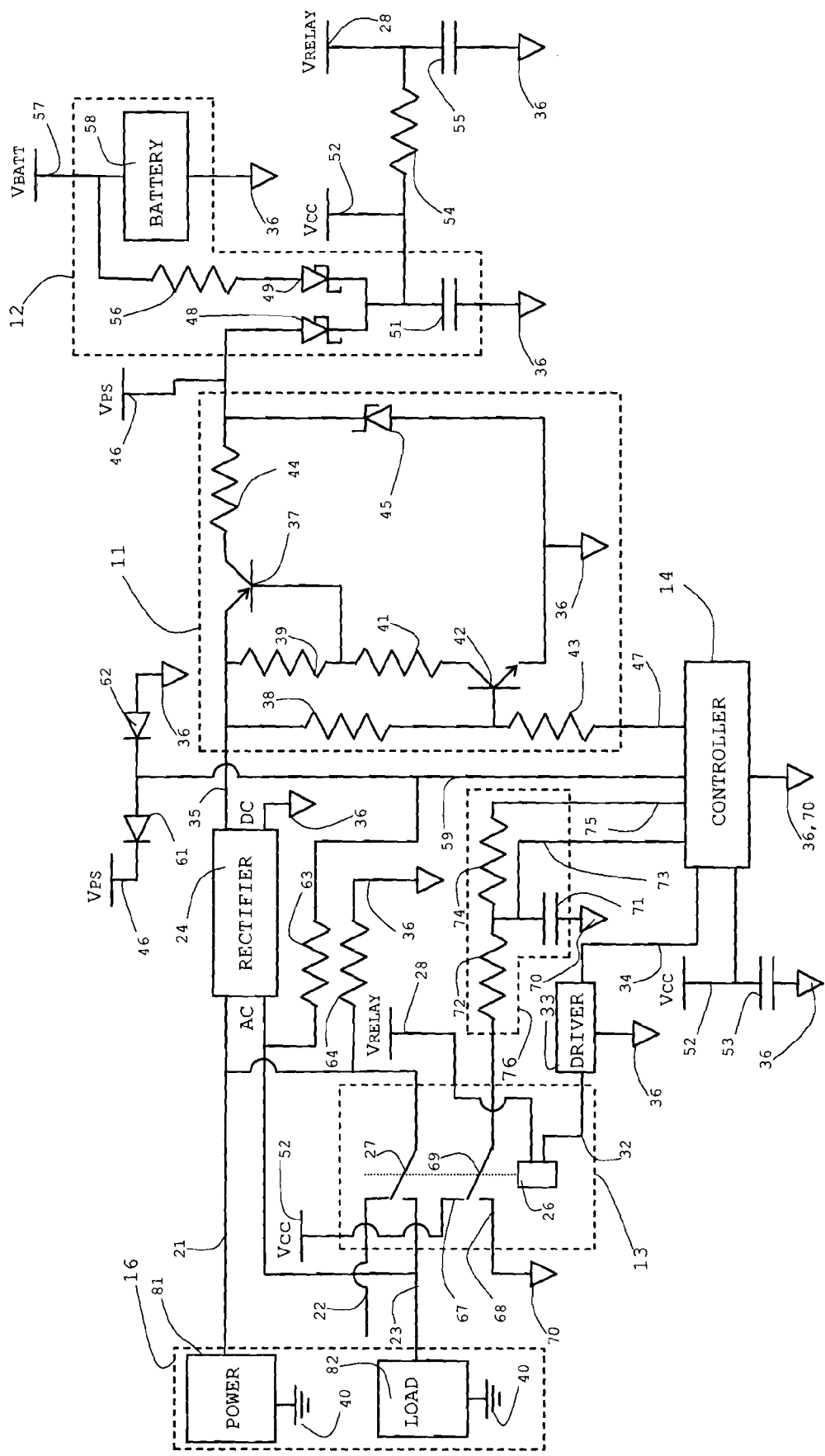
FIG. 3 shows a switch state assurance system having a one component actuator in conjunction with a power stealing mechanism in a control system.
Figure 4:
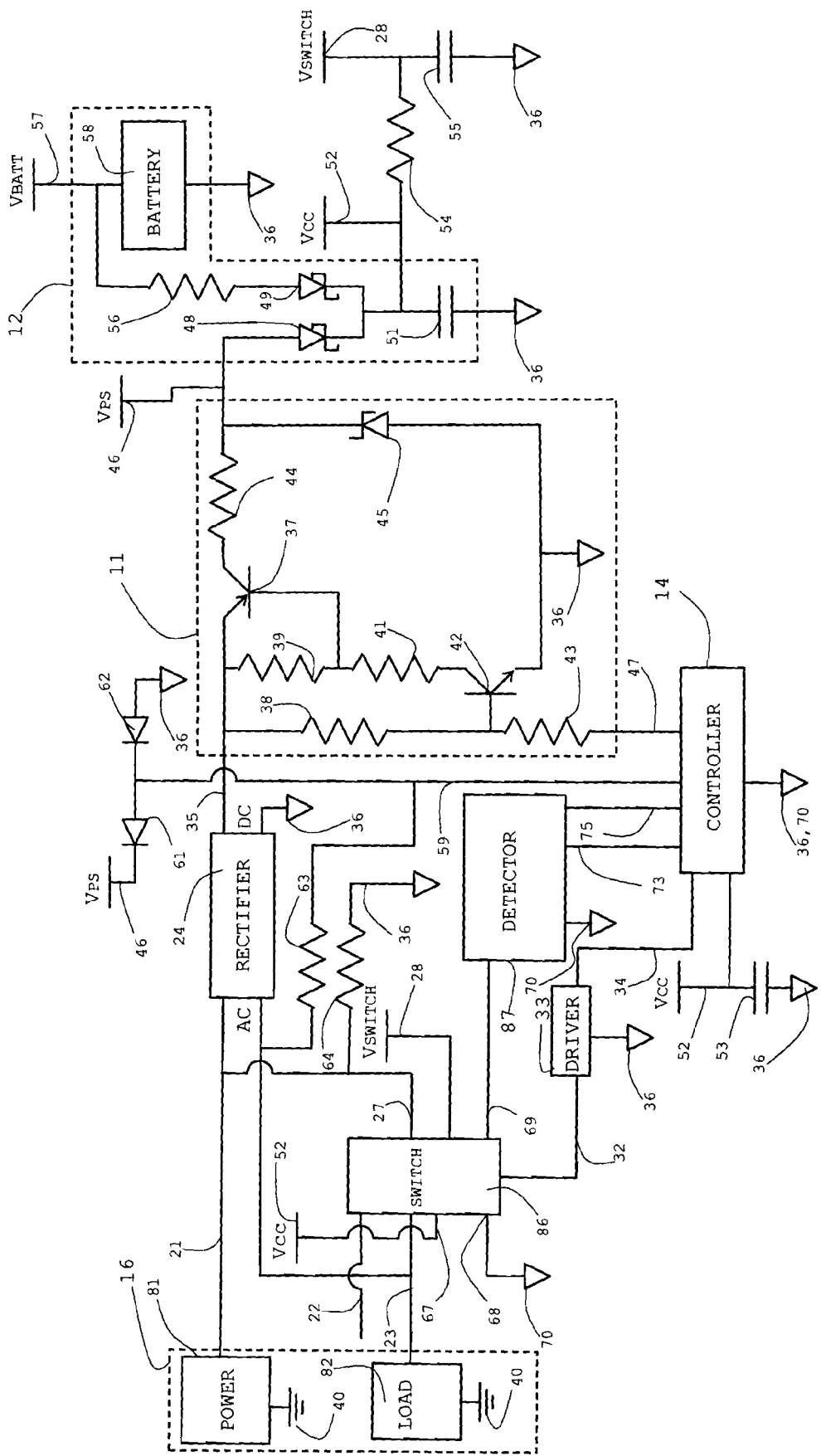
FIG. 4 shows a switch state assurance system having a solid state switch in conjunction with a power stealing mechanism in a control system.

FIG. 1 is a block diagram of the switch state assurance system, which includes the thermostatic load and power 16, detection circuit 76, 87, controller 14, drive circuit 33 and latching switch 13, 86. The blocks of this Figure are referred to in FIGS. 2, 3 and 4. FIG. 2 shows a power stealing circuit which encompasses an illustrative example of the subject invention, a relay state or position assurance mechanism. This mechanism may include a controller, state assurance circuit, or interface circuit integrated with the relay and power stealing circuit. The state assurance circuit or system may include resistors 72 and 74, capacitor 71, lines 73 and 75, contacts 67 and 68, and a middle, center, common or arm contact 69. Also, actuator 25, actuator 26, driver or drive circuit 33, line 31 and line 32 may be part of the state assurance system in FIG. 2. FIG. 3 shows the system of FIG. 2 with one actuator 26, which has the capability of switching the arm contact from a connection of one contact to another contact of each set of contacts. FIG. 4 shows the system of FIG. 2 with a latching switch 86 (e.g., solid state) in lieu of relay 13, which has the equivalent capability of switching the middle, center, common or arm contact from a connection of one contact to another contact of each set of contacts as in relay 13. Relay 13 or switch 86 may have several sets of contacts or their equivalents, respectively. Relay 13 or its equivalent may be regarded as a double pole, double throw (DPDT) switch.

Components 71, 72 and 74 may constitute, at least in part, a detection circuit as represented by a block 76 in FIGS. 1, 2 and 3. In lieu of detection circuit 76, FIG. 4 may have a detector device, mechanism, or circuit 87 that is a compatible interface between switch 86 and controller 14. The detection circuit 76, 87, not necessarily having direct connections to the relay or switch, may include a Hall sensor proximate to the relay, a LED type sensor, a magnetic flux sensor, optical sensor, or the like. The illustrative examples of FIGS. 2 and 3 may be noted more specifically. FIG. 2 illustrates schematically the operation of the state assurance of relay 13. Relay 13 may have several sets of contacts. One set of contacts, terminals, contacts or lines 22 and 23, and a middle, common, terminal or arm contact 27 which may be a part of the load-switched circuit. A second set of contacts, terminals or lines 67 and 68, and a middle, common terminal, or arm contact 69 may be a part of the state assurance circuit. In the "off" state or position 1, the relay common, middle, center, terminal or arm contact 69 may be tied to a VCC terminal 52 through the relay's contact 67. The state assurance pull-up line 75 may be held at an output-high and the state assurance input line 73 will in turn be high. If a large shock is encountered, the relay common, middle, terminal or arm contact 69 may move to the "on" state or position 2 at contact 68 which is connected to a reference voltage or circuit ground 70 and allows a 0.01 microfarad capacitor 71 to discharge through a 200 ohm resistor 72 and through the relay's contact 68 to the reference voltage or circuit ground 70. At the same time, a high-to-low pin change interrupt may occur on line 73 which will allow the microcontroller 14 to wake up out of a sleep mode and into a wake mode. Afterwards, a sustaining current may be provided via a 3.32 kilo-ohm resistor 74 and line 75 since line 75 was previously held high. After a short duration, the microcontroller 14 can set line 75 output low which removes the sustaining current and the final total current may go to zero. The final step of the state assurance operation is to read the input of line 73 to determine the final state or position of the relay 13. If the relay 13 was supposed to be "off" (position 1 with VCC to line 73) but instead a low state provided by a voltage divider connected to reference voltage or circuit ground 70 is detected on line 73 indicating the relay in the "on" state (position 2 with arm contact 69 at contact 68), then the microcontroller 14 may attempt to return the relay 13 back to the "off" state (position 1) via a signal on a line 34 from controller 14 to a driver 33 which drives an actuator 25 via a line 31 (or actuator 26 via line 32 in FIG. 3) to move the control arm contacts 27 and 69 to the "off" state (position 1) at contacts 22 and 67, respectively. If only an actuator 26 is used for moving the arm contact, it may be the type that can move the arm contacts to either position for each pole. If the switch 86 (e.g., solid state or other technology) of FIG. 4 is used, it may have similar latching characteristics and provide the equivalent circuit connections as the latching relay 13 for the switch or relay state assurance system.

The state assurance system reference voltage or circuit ground 70 may be connected to and be common with the overall power-stealing circuit ground 36. Controller 14 may be a model ATMEGA48V-10 eight bit microcontroller with terminals line 73 and line 75. This microcontroller may be possibly available from a vendor such as Atmel Corporation.

The remaining portion of the circuit in FIGS. 2 and 3 is an illustrative example of the state assurance circuit integrated with a power stealing mechanism. The state assurance circuit may be applicable to other kinds of circuits.

Power may be picked off of an electrical supply or power 81 for a load 82 of a controlled system 16. When system 16 is in an on cycle, then power 81 is connected via lead 21, arm contact 27 of relay 13, and relay contact or lead 23 to the load 82. When the system 16 is in an off cycle, then the power is connected to rectifier 24 via the lead 21, since arm contact 27 is not connected to contact or lead 23 for bypassing, shunting or shorting out the input of the rectifier 24 to directly connect the power 81 output on lead 21 directly to load 82. In the off cycle the power supply 81 circuit includes going from contact or lead 21 via the rectifier 24 to contact or lead 23 which is connected to the load 82. When the circuit includes rectifier 24, then power stealing from the power supply 81 may occur. The load 82, because of its relatively low impedance, effectively becomes a connection to ground side 40 or other polarity of the power supply 81 output for rectifier 24. Control of power 81 to the power stealing circuit may involve the portion of relay 13 with the common terminal or arm contact 27. The relay 13 may be controlled by a controller 14. The relay 13 may permit the power-stealing circuit 11 to take power for a control device, such as thermostatic electronics, from power supply 81 for the thermostatic load 82. Then the power taken by circuit 11 from contacts or terminals 21 and 23 may be conveyed to a storage/power device 12. Device 12 may have a capacitor, rechargeable battery, non-chargeable battery, solar cell, fuel cell, and/or the like. Some of the stored power may be provided to the controller 14 to sustain operation of it, and similarly to relay 13 and circuit 11. With a relay 13 in an "off" state (position 1), contact or line 21 is not connected to a contact, line or terminal 23. With relay 13 in an "on" state (position 2), then contact or line 23 is connected to contact or line 21.

The relay 13 in FIG. 3 may have the actuator or solenoid 26 that is connected by a driver 33 via line 32 to ground, since the other end of the solenoid is connected to V$_{RELAY}$ on line 28, to pull a common terminal or arm contact 27 down to connect terminals or contacts 21 and 23 to connect the load 82 to its power 81. Upon disconnecting the terminal or line 32 of solenoid 26 from ground, the arm contact 27 may remain in the same position 2 having contact with line 23. To move arm contact 27 of relay 13 to position 1, driver 33 may cause solenoid 26 to reverse its polarity via line 32 for the single actuator configuration of FIG. 3. For the several actuator configuration of FIG. 2, driver 33 may connect line 31 of solenoid 25 to ground thereby energizing the solenoid relative to line 28 of V$_{RELAY}$ and pulling arm contact 27 up to connect with contact or terminal 22. Then, there may be an AC voltage across terminals 21 and 23 which are connected to rectifier 24 for rectification of the input to a DC output at terminals 35 and 36. The voltage at terminals 21 and 23 may instead be DC and the rectifier 24 might not be needed.

In summary, driver 33 may change the position of the relay 13 with a signal on line 34 from controller 14. Driver 33 may short line 32 of solenoid 26 to ground 36 to move arm contacts 27 and 69 from terminals or contacts 22 and 67 to terminals or contacts 23 and 68, respectively. On the other hand, driver 33 may short line 31 of solenoid 25 to ground 36 to move arm contacts 27 and 69 from terminals 23 and 68 to terminals 22 and 67, respectively. In the case of a single solenoid 26 of FIG. 3, a polarity reversal may cause the arm contacts to move the arm contacts 27 and 69 from terminals 23 and 68 to terminals 22 and 67, respectively. When each of the arm contacts 27 and 69 are moved from one contact to another, with an activation of a solenoid 25 or 26, or solenoid 26 alone, the lead or line 31 or 32 need not to be constantly held to ground to maintain arm contacts 27 and 69 at their last moved-to positions. Also, if the relay voltage 28 is non-existent, then arm contacts 27 and 69 may remain in their last position with neither solenoid activated or energized. For example, in the two solenoid version, the grounding of lines 31 and 32 need be only temporary to change the position of arm contacts 27 and 69. Significant energy may be needed to change the state of the relay, whereas very little or no external energy is needed to maintain the state of the relay. Because of these characteristics, relay 13 may be regarded as a latching relay. However, arm contacts 27 and 69 of relay 13 may be unnaturally moved without an activation of either solenoid 25 or 26 of FIG. 2, or solenoid 26 of FIG. 3, or even switch 86 of FIG. 4, through, for example, physical shock of the relay or EMI shock of the switch 86. However, the present invention may restore the arm contacts 27 and 69, or switch 86, to the proper, former or desired positions. Incidentally, in the two solenoid configuration of FIG. 2, lines 31 and 32 should not be shorted to ground 36 at the same time.

Relay 13 and detection circuit 76 may be substituted with an equivalent latching device such as a solid state switch or logic circuit 86 along with a detection circuit 87, respectively, as shown in FIG. 4. The state or "position" of the latter may be affected by an external factor such as, for example, an EMI spike. The present invention may provide state assurance for the equivalent latching device, such as the switch or circuit, in an equivalent manner as done herein for the latching relay 13.

When a voltage from a load 16 and its power supply is across the input lines 21 and 23 to rectifier 24, then there may be a DC voltage at the output of rectifier 24 on line 35 relative to the device ground 36. This may be an "off" cycle of the thermostatic system with the load 16. Power stealing may be done during the off cycle of the thermostatic system. The rectifier output voltage (i.e., "power") on line 35 may go to the power stealing circuit 11. Line 35 may be connected to an emitter of PNP transistor 37. Transistor 37 may be, for example, a part number MMBT2907A, possibly available from a vendor such as Diodes Inc. Resistors 38 and 39 may have one end connected to line 35. Resistors 38 and 39 may be about 10 megohms and 20 K ohms, respectively. The other end of resistor 39 may be connected to the base of transistor 37 and one end of a resistor 41. Resistor 41 may be about 100 K ohms. The other end of resistor 41 may be connected to a collector of an NPN transistor 42. Transistor 42 may be, for example, a part number MMBTA05LT1, such as an "ON Semiconductor™" device. The other end of resistor 38 may be connected to the base of transistor 42 and to one end of a resistor 43 of about 20 K ohms. The other end of resistor 43 may be a power-steal control line 47 that is connected to controller 14. The collector of transistor 37 may be connected to one end of a resistor 44 of about 20 K ohms. The other end of resistor 44 may provide a power-steal output voltage ($V_{PS}$) line 46 of circuit 11. The emitter of transistor 42 and an anode of a zener diode 45 may be connected to device ground 36. The cathode end of diode 45 may be connected to line 46. Diode 45 may be a 5.1 volt zener diode having, for example, a part number MMSZ4689, possibly available from Fairchild Semiconductor Corporation. Resistor 44 may be a current limiting resistor.

The output line $V_{PS}$ 46 of circuit 11 may go to a storage/power device 12. Line 46 may be connected to an anode of a diode 48. The cathode of diode 48 may be connected to the cathode of diode 49. Diodes 48 and 49 may be a pair of Schottky diodes having a part number BAS70-05, which possibly is available from General Semiconductor, Inc., in Melville, N.Y. A capacitor 51 may at the same time be a storage device for power stealing by circuit 11 provided at $V_{PS}$ terminal or line 46. Capacitor 51 could be replaced by a rechargeable battery. The cathodes of diodes 48 and 49 may be connected to one end of the storage capacitor 51 which may be about 47 millifarads. This end of capacitor 51 may be regarded as a voltage terminal ($V_{CC}$) 52. $V_{CC}$ 52 may be connected to the controller 14. Connected between $V_{CC}$ 52 and device ground 36 may be at least one 0.1 microfarad capacitor 53. The other end of storage capacitor 51 may be connected to device ground 36.

A resistor 54 of about 274 ohms may have one end connected to $V_{CC}$ terminal 52 and the other end connected to the $V_{RELAY}$ terminal 28. A capacitor 55 of about 1000 microfarads may be connected between $V_{RELAY}$ terminal 28 and device ground 36.

A resistor 56 of about 274 ohms may have one end connected to the anode of diode 49 and another end connected to a battery voltage ($V_{BATT}$) terminal 57. Terminal 57 may be connected to a positive terminal of a battery 58. The negative terminal of battery 58 may be connected to the device ground 36. Battery 58 may be an externally or internally chargeable storage battery, a non-chargeable battery, or a back-up voltage source at terminal 57. The battery 58 may provide power to controller 14 and other components of the system electronics as may be needed. This battery 58 may be a primary source or secondary backup source, and in that place it may be a non-chargeable or chargeable battery, fuel cell, solar cell, or the like.

The $V_{PS}$ terminal 46 may be connected to the cathode of a diode 61. The anode of diode 61 may be connected to the cathode of a diode 62. The anode of diode 62 may be connected to device ground 36. Diodes 61 and 62 may have, for example, a part number BAV199 and be possibly available from a vendor such as Diodes Incorporated. The common connection between diodes 61 and 62 may be connected via a line 59 to the controller 14. Line 59 may provide to controller 14 a status signal of line 23 to rectifier 24 via a resistor 63 of about 1.2 megohms. There may be a pull-down resistor 64 of about 1.2 megohms connected between line 21 of rectifier 24 and the device ground 36.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A switch state assurance system comprising:
a switch having at least two states;
a detector connected to the switch; and
a controller coupled to the detector and the switch; and
wherein:
the detector determines the state of the switch;
the controller determines whether the state of the switch is a desired state;
if the state of the switch is not the desired state, then the controller sends a signal to the switch to put the switch in the desired state;
the switch is a latching relay;
the relay comprises a first set of contacts coupled to the detector; and
the relay comprises a second set of contacts connected to a controlled system and to a power stealing circuit.

2. The system of claim 1, wherein:
the relay comprises an actuator connected to the controller;
the at least two states comprise a first state and a second state;
in the first state, the power stealing circuit is connected to power from the controlled system while the controlled system is in the off cycle; and
in the second state, the power stealing circuit is not connected to power of the controlled system.

3. A switch state assurance system comprising:
a switch having a first state and a second state;
a detection circuit connected to the switch;
a drive circuit connected to the switch; and
a control circuit connected to the detection circuit and the drive circuit; and
wherein:
the control circuit is for assuring a first state or second state of the switch;
the switch comprises:
a first set of contacts;
a second set of contacts; and
an actuator connected to the drive circuit;
the first set of contacts comprises a first arm contact;
the second set of contacts comprises a second arm contact connected to the detection circuit;
the actuator is for moving the first arm contact and the second arm contact to a first state position and the first arm contact and the second arm contact to a second state position;
the first set of contacts further comprises a first pole contact and a second pole contact;

the second pair of contacts further comprises a first contact and a second pole contact;

the first arm contact in the first state position is connected to the first pole contact of the first set of contacts;

the first arm contact in the second state position is connected to the second pole contact of the first set of contacts;

the second arm contact in the first state position is connected to the first pole contact of the second set of contacts;

the second arm contact in the second state position is connected to the second pole contact of the second set of contacts;

the first arm contact is for connection to a first terminal of a power supply and is connected to a first input of a power stealing circuit; and the second pole contact of the first set of contacts is connected to a second input of the power stealing system and is for connection to a first terminal of a load.

4. The system of claim 3, wherein:

the power supply has a second terminal connected to a common terminal; and the load has a second terminal connected to the common terminal.

5. The system of claim 3, wherein:

if the switch is in the first state, then the first input and the second input of the power stealing circuit is for connection to the first terminal of the power supply and connection to the first terminal of the load, respectively, and the detection circuit is connected to a voltage;

if the switch is in the second state, then the first terminal of the power supply is for connection to the first input of the load, and the detection circuit is connected to a reference terminal.

6. The system of claim 5, wherein:

if a desired state of the switch is the first state and the detection circuit is connected to the reference terminal indicating the switch to be in the second state, then the actuator may change the state of the switch to the first state;

if a desired state of the switch is the second state and the detection circuit is connected to a voltage indicating the switch to be in the first state, then the actuator may change the state of the switch to the second state.

7. An approach for assuring a state of a switch, comprising:

providing a latching switch having at least two states;

detecting a present state of the switch;

changing the state of the switch to another state if the present state is not a desired pre-installation state; and the desired pre-installation state is an off state when a power stealing circuit of a thermostat is to be connected by the switch to power of a controlled system upon installation.

8. The approach of claim 7, wherein an undesired pre-installation state is an on state when the controlled system is to be connected by the switch to power upon installation.

9. The approach of claim 8, wherein:

the detecting the present state of the switch is effected by a detector connected to the switch; and the changing of the state of the switch is effected by a controller connected to the switch and the detector.

10. The approach of claim 9, wherein the switch is a relay.

* * * * *

UNITED STATES PATENT AND TRADEMARK OFFICE
CERTIFICATE OF CORRECTION

PATENT NO. : 7,642,674 B2
APPLICATION NO. : 11/381918
DATED : January 5, 2010
INVENTOR(S) : Mulhouse et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 642 days.

Signed and Sealed this

Sixteenth Day of November, 2010

David J. Kappos
*Director of the United States Patent and Trademark Office*